Oct. 8, 1929.  S. N. BUCHANAN ET AL  1,730,993
ELECTRICAL WIRE FISH LINE
Filed Jan. 31, 1928

INVENTORS
STEPHEN N. BUCHANAN
LEWIS H. CHURCH
BY
A. D. T. Libby
ATTORNEY

Patented Oct. 8, 1929

1,730,993

UNITED STATES PATENT OFFICE

STEPHEN N. BUCHANAN, OF NEW YORK, N. Y., AND LEWIS H. CHURCH, OF WESTFIELD, NEW JERSEY, ASSIGNORS TO THOMAS & BETTS CO., OF ELIZABETH, NEW JERSEY, A CORPORATION OF NEW JERSEY

ELECTRICAL-WIRE FISHLINE

Application filed January 31, 1928. Serial No. 250,828.

This invention relates to a fish line used for the purpose of fishing electrical wires or cables through conduits.

A fish line suitable for this purpose must have considerable stiffness and elasticity so that the wire can be pushed through the conduit or passage without doubling up, yet have flexibility enough to follow the contour of the conduit or passage. When a plain fish wire having these characteristics is used, the end is apt to catch on a joint or some other obstruction in the conduit or passage and make it tedious and slow to get the fish wire through.

To overcome this objectionable feature, I have provided a ball or head on the end of the fish wire, which head is so formed as to make it easy to push the fish wire through the conduit. At the same time, I have provided a ball or head for the fish line of a special shape, so that the electrical wire that is to be drawn through the conduit may be quickly attached to the head end in such a way as to occupy a space less than the largest diameter of the head, so that the fish line with the electrical wire attached to the head may be readily drawn through the conduit.

Another object is to provide a simple and cheap yet very positive means of attaching the head to the fish line. These and other objects will be apparent to one skilled in this particular art after a study of the specification in connection with the annexed drawing wherein Figure 1 is a view (about double size) of a portion of the fish line with the head attached thereto.

Referring now to the details wherein like numbers refer to corresponding parts in the various views.

1 is a fish line of any suitable material, such as steel, of a construction having suitable rigidity and elasticity, 2 illustrates a preferred form of head attached to the fish wire 1. The head 2 is preferably made in the form of a double cone, the base of these cones being illustrated at point 3.

Figure 1:
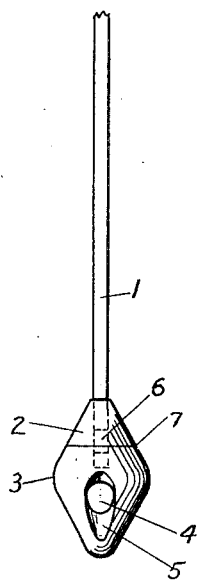

Referring to Figure 1, the lower cone is provided with a transverse hole 4, and extending from the opposite ends of this hole, are grooves 5 which act as receptacles for the electrical wire, it being understood that the end of the electrical wire is passed through the hole 4 and then bent downward and twisted around on itself in a manner which is so obvious that it has not been shown on the drawing.

By providing grooves 5, the electrical wire is positioned therein in such a manner as to assist in preventing the electrical wire or cable from being twisted out of position, and provides means for keeping the diameter at the point where the wire is passed through the hole 4 of a less value than the diameter of the base of the cones at point 3. This prevents any frictional engagement of the wire with the conduit, contact with which is made on the surface of the head at the base of the cones, as the fish line and electrical cable are pulled through the conduit.

Figure 2:
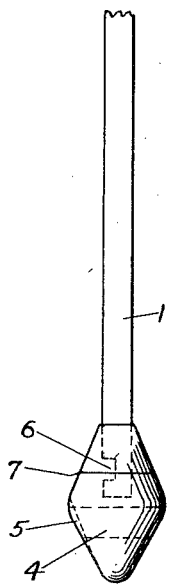
Figure 2 is a view (about double size) of Figure 1, but with the same turned through an angle of 90 degrees.

As shown in Figures 1 and 2, the fish wire 1 is attached to the head in a satisfactory means, as by means of notch 6 in the fish wire 1. The upper cone is provided with an opening and the fish wire 1 inserted therein; and then the head is pressed or mashed down on line 7 so as to force the metal of the head into the notch 6.

Figure 5:
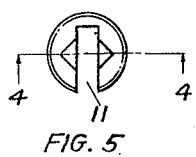
Figure 5 is a top plan view of the plug as shown in Figure 4.
Figure 4:
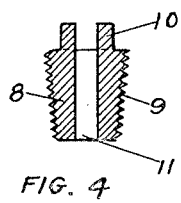
Figure 4 is an enlarged sectional view on line 4—4 of Figure 5, showing the attachment means illustrated in Figure 3.

As an alternative form of attaching the fish wire 1 to the head 2, I have provided a plug 8 having preferably a tapered pipe thread 9 and the usual portion 10 for the application of a wrench for screwing the plug into the head 2. The plug 8 is provided with a longitudinal slot 11 which preferably passes beyond the axial center of the plug as indicated in Figure 5.

Figure 3:
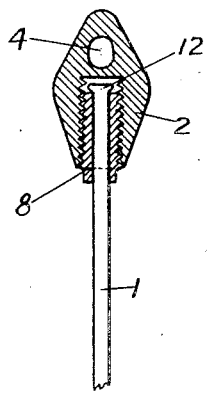
Figure 3 is a sectional view (about double size) through a modified form of head, showing the means of fastening the fish wire to the head.

To cooperate with the plug 8, I have provided an upset end 12 on the fish wire as shown in Figure 3, and after placing the fish wire 1 in the slot 11, the plug 8 and head 2 are screwed together. The head 2 is preferably made of material such as steel, and of sufficient strength to collapse the plug 8 when a tapered plug or one having a pipe thread is used as it is screwed into the head, so that the slot 11 is closed in to securely grip the fish wire 1. In certain cases we may use a straight or machine thread on the ball and plug and depend on the enlarged end of the fish wire or equivalent means to prevent it from being withdrawn from the plug.

As shown in the drawing, the fish wire 1 has a cross-section, preferably rectangular in shape and rounded at the edges. This form of fish wire is especially adapted to lie in the slot 11. and when the fit of the wire in the slot is sufficiently close, the enlarged head used in connection with a straight threaded plug as above set forth is quite sufficient to hold the fish wire from withdrawal.

It will be obvious that other means than the upset end 12 may be used to assist in preventing the fish wire 1 from being pulled out of the head 2, and certain other of the details may also be varied from those illustrated.

Having thus described the invention, what we claim is:

1. An electrical wire fish line comprising; a fish wire, an attachment head for the electrical wire and means for attaching the head to the fish wire; said means including a tapered threaded plug having a longitudinal slot therein extending preferably beyond the longitudinal axis of the plug, said fish wire being adapted to lie in said slot and having means extending across the inner end of the plug to assist in preventing withdrawal from the plug, said head having a bore threaded to receive said plug and constructed of a material rigid enough to collapse said plug to close said slot in the plug as the head and plug are screwed together, and a transverse bore through the head for the purpose described.

2. An electrical wire fish line comprising; a fish wire, an attachment head for the electrical wire and means for attaching the head to the fish wire; said means including a tapered threaded plug having a longitudinal slot therein extending preferably beyond the longitudinal axis of the plug, said fish wire being adapted to lie in said slot and having means cooperating with the plug to assist in preventing withdrawal from the plug, said head having a bore to receive said plug and constructed of a material of sufficient strength and rigidity to collapse said plug to close the slot therein as the head and plug are screwed together, said head having a transverse bore adjacent the end of the plug bore and grooves leading from the opposite ends of the transverse hole toward the free end of the head as and for the purpose described.

3. An electrical wire fish line comprising; a fish wire, an attachment head for the electrical wire and means for attaching the head to the fish wire; said means including a threaded bore in the head and a threaded tapered plug adapted to be screwed into said bore, said plug having means to receive the end of the fish wire, said last mentioned means being altered by the act of screwing the head and plug together whereby the fish wire is securely gripped by the plug, said head having a transverse hole therein and slots extending from the ends of the hole toward the free end of the head as and for the purpose described.

4. An electrical wire fish line comprising a fish wire, an attachment head for the electrical wire and means for attaching the head to the fish wire; said means including a threaded bore in the head and a threaded plug adapted to be screwed into said bore, said plug having a longitudinal slot within which the fish wire may lie and means cooperating between the end of the fish line and the plug to prevent the wire from being withdrawn from the plug, said head having a transverse hole therein through which the electrical wire may be passed as described.

5. An electrical wire fish line comprising; a fish wire, an attachment head for the electrical wire and means for attaching the head to the fish wire; said means including a bore in the head and a plug to fit said bore with means for holding the plug in said bore, said plug having a longitudinal slot within which the fish wire may lie and means cooperating between the end of the fish line and the plug to prevent the wire from being withdrawn from the plug, said head having a transverse hole therein through which the electrical wire may be passed and grooves leading from the opposite ends of the hole toward the free end of the head for the purposes described.

In testimony whereof, we affix our signatures.

STEPHEN N. BUCHANAN.
LEWIS H. CHURCH.